Sept. 29, 1931.  A. S. FITZGERALD  1,825,514
APPARATUS FOR MEASURING DIRECT CURRENTS
Filed Nov. 29, 1930  2 Sheets-Sheet 1

Inventor:
Alan S. FitzGerald,
by Charles E. Mullen
His Attorney.

Sept. 29, 1931.   A. S. FITZGERALD   1,825,514
APPARATUS FOR MEASURING DIRECT CURRENTS
Filed Nov. 29, 1930   2 Sheets-Sheet 2
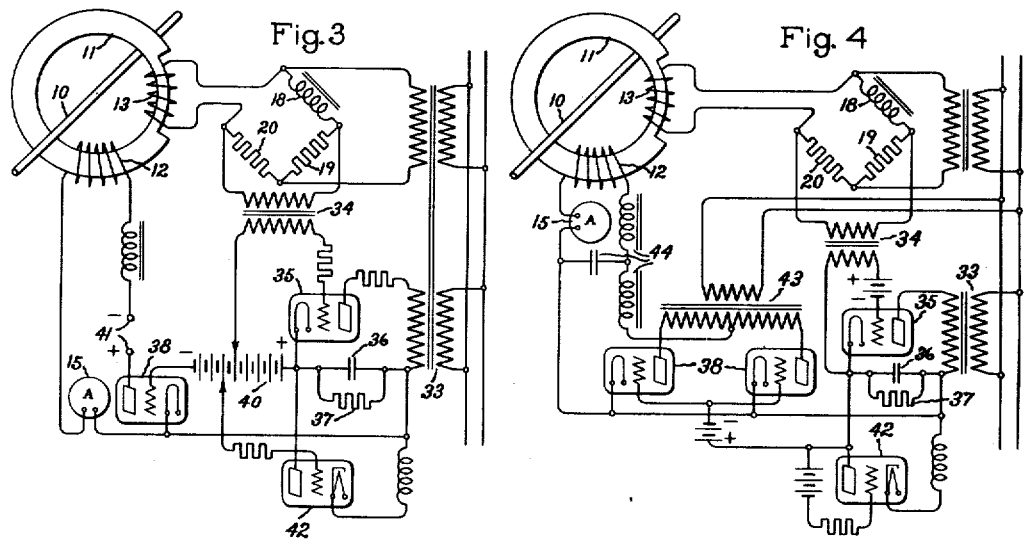
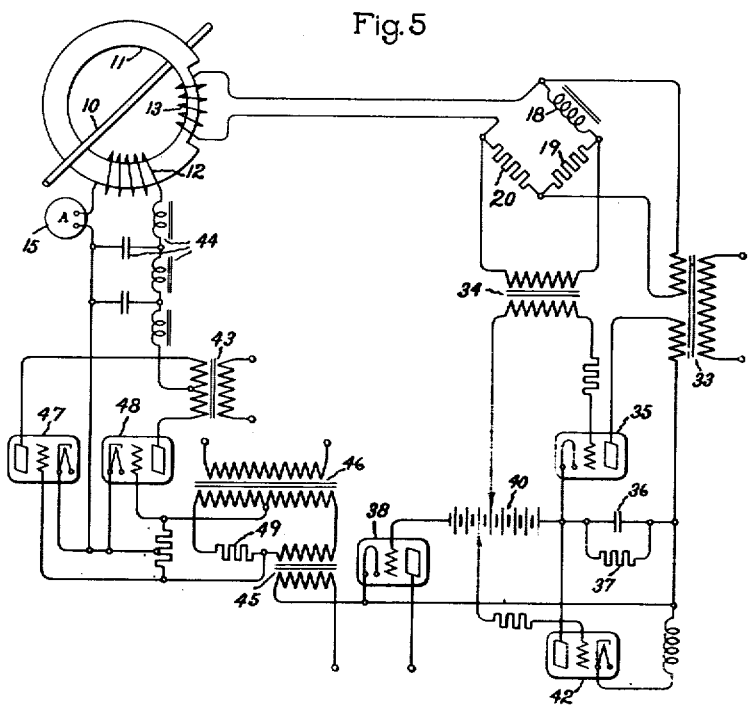
Inventor:
Alan S. FitzGerald,
by Charles E. Tullar
His Attorney.

Patented Sept. 29, 1931

1,825,514

UNITED STATES PATENT OFFICE

ALAN S. FITZ GERALD, OF WYNNEWOOD, PENNSYLVANIA, ASSIGNOR TO GENERAL ELECTRIC COMPANY, A CORPORATION OF NEW YORK

APPARATUS FOR MEASURING DIRECT CURRENTS

Application filed November 29, 1930. Serial No. 499,120.

My invention relates to apparatus for measuring the flow of direct current and is particularly useful where it is desirable to maintain a safe insulation barrier between the high voltage circuit in which the current is to be measured and the auxiliary measuring circuit and apparatus. So far as my invention resembles prior art devices, it may be considered as an improvement on the direct current transformer measuring scheme described in the Electrical World of October 2, 1915, pages 751 and 552, by Otto A. Knopp. My invention resembles the scheme described by Knopp in that I provide a magnetic coupling between the direct current circuit to be metered and the measuring circuit containing an indicating instrument. However in my invention I avoid the use of any movable indicator or contact mechanism such as is described by Knopp on or adjacent to the magnetic core which comprises the magnetic coupling of the direct current transformer. My invention therefore is comparable to the ordinary current transformer in its simple, rugged construction.

The features of my invention which are believed to be new and patentable will be pointed out in the claims appended hereto. For a better understanding of my invention, reference is made in the following description to the accompanying drawings.

Figure 1:
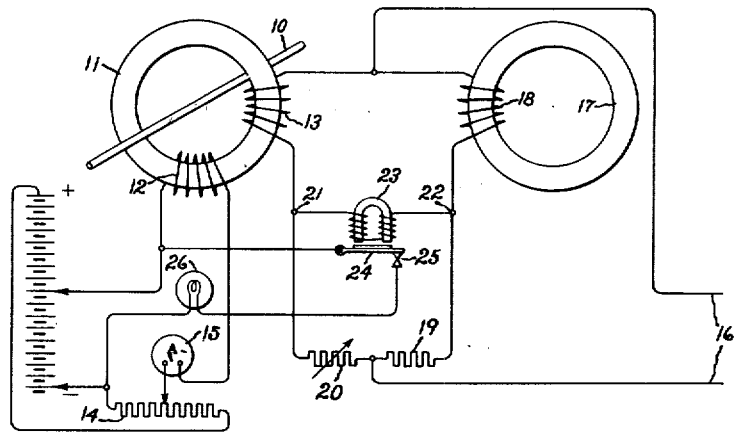

Fig. 1 shows a simple form of the invention in which a magnetic core couples the direct current line conductor which we may term the primary with a measuring circuit which we may term the secondary circuit and also with a testing or detecting circuit. The measuring circuit produces a unidirectional flux in the core of the transformer which is opposed to the flux produced therein by the current of the primary and means are provided for adjusting the secondary current until the primary and secondary ampere turns balance and neutralize each other. The detecting circuit is employed to determine when this balanced condition exists at which time the current flow in the secondary circuit may be measured in terms of the primary current flow. This general principle is used in all modifications of the invention illustrated. In Fig. 1, an ordinary relay associated with the detecting circuit operates to indicate when the ampere turns in the primary and secondary are balanced and manual adjustment of the current in the measuring circuit is used to obtain this balance.

Figure 2:
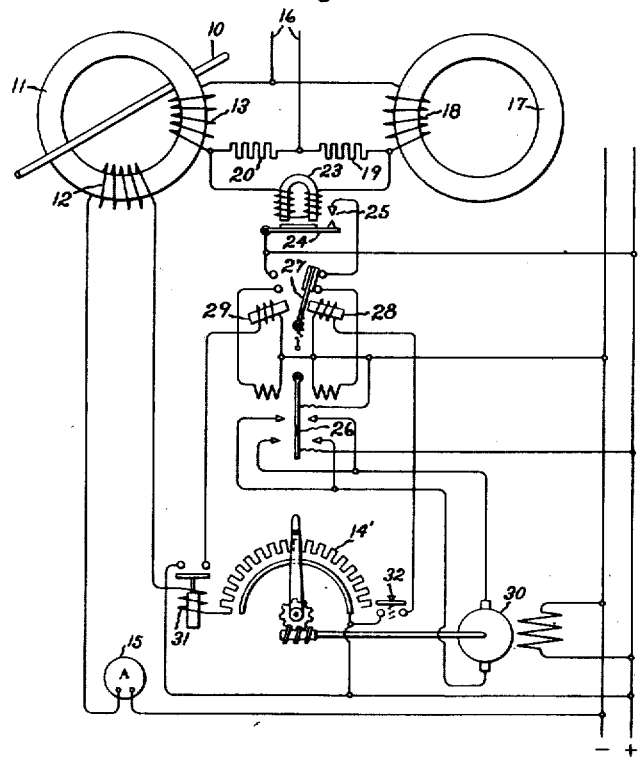

In Fig. 2, the adjustment of the current of the measuring circuit is accomplished automatically through a motor operated rheostat controlled by a relay in the detecting circuit.

In Figs. 3, 4 and 5, different vacuum tube control schemes are employed for automatically maintaining a balanced condition between the ampere turns of the primary and secondary circuits. In these modifications the control is substantially instantaneous so that the indicating instrument in the measuring circuit shows the current flow in the primary circuits all the time without any delay.

In all of the illustrations a single turn primary transformer has been shown and no insulation other than air has been represented between the primary circuit and the remainder of the apparatus. However, I wish to have it understood that in general the transformer may be constructed in accordance with the existing practice in building high voltage current transformers in so far as these features are concerned. For example, a bushing type transformer construction may be employed. In general, it will be advantageous to select a core material for the transformer which is high in permeability at low magnetizing forces. Where high sensitivity is desired, I have found that the nickel-iron alloy described in Elmen Patent 1,586,884, June 1, 1926, is satisfactory. This alloy contains approximately 78½% nickel, 21½% iron, and has a very high permeability at low flux densities. Its permeability is materially higher than iron or silicon steel. However, in recommending this material, I do not wish to limit my invention to any particular magnetic material.

Referring now to Fig. 1, 10 represents a high voltage direct current conductor in which it is desired to measure the current. The conductor is surrounded by a magnetic core 11 on which are wound a secondary coil 12 and a detecting or test coil 13. It will be understood that the conductor 10 may be insulated from the core 11 and the secondary windings 12 and 13 in accordance with the usual practice employed in connection with the construction of high voltage current transformers. The secondary coil 12 is connected to a low voltage direct current source in series with a current adjusting device 14 and a direct current measuring instrument 15. When direct current flows in the conductor 10, it produces a unidirectional flux in the core 11. The direction of the current in coil 12 is such as to produce a flux in core 11 which opposes the flux set up by the primary conductor 10. When these two fluxes are balanced or neutralize each other, the ampere turns in the primary and secondary are equal and balanced and the instrument 15 will give an indication of the current flow in the primary conductor 10, the ratio of currents in the two circuits being inversely proportional to the number of turns in the primary windings 10 and 12. The coil 13 is connected as one arm of an impedance bridge circuit supplied from an alternating current source 16. The opposite arm of the bridge circuit contains an impedance, comprising core 17 and coil 18, which is equal to the impedance of 13. The other two arms of the bridge comprise resistances 19, 20, one of which may be adjustable for calibration purposes. This bridge circuit is so adjusted that when there is no flux in core 11 due to a balance of the ampere turns in 10 and 12, the bridge will be balanced and the voltage across points 21 and 22 of the bridge circuit will be zero. A relay 23 is connected across these points and under conditions of unbalance the relay attracts its armature 24. However, as soon as a balanced condition is reached, armature 24 drops and closes contact 25 in the circuit of a lamp or other signalling device 26. The operator who adjusts resistance 14 to bring about this balanced condition then knows that the ampere turns of the primary and secondary of the direct current transformer are balanced and he then reads the ammeter 15. To measure current in either direction in conductor 10, the ammeter 15 may have a mid-scale zero and the direct current source arranged as shown to produce current in either direction in the secondary measuring circuit.

It will be noted that the circuits associated with the instrument are low voltage, requiring only small currents. This method of measurement is independent of the impedance of the secondary circuit in which the ammeter 15 is contained; consequently relays and other devices may be included in this circuit without in any way interfering with the accuracy of measurement.

Fig. 2 shows a complete system of connections for automatically adjusting to a balanced condition so as to avoid the manual performance of this operation and comprises an automatic follower mechanism for balancing the bridge circuit by a motor controlled rheostat 14' in the measuring circuit. Those parts which are similar to those previously described in connection with Fig. 1 are indicated by like reference characters.

The development of automatic follower mechanism for balancing any kind of a bridge circuit is a familiar problem. Such devices are well known in connection with temperature measuring systems and many other applications. There is, however, a special feature of the present balancing circuit which differs from the better known arrangement. The usual follower mechanism operates in connection with a bridge circuit which has three operating conditions, as follows: The bridge may be balanced, it may be unbalanced in one direction, or it may be unbalanced in the other direction. Thus the detecting device or relay receives a voltage differing in polarity according to whether the bridge is above or below the balance point and the motor-operated rheostat may be arranged to run in one direction or the other, according to whether the bridge is above or below balance, and to stop when the balance point is reached.

In the present scheme the above condition does not hold since the change in impedance of the alternating current search coil 13 is independent of whether the difference in resultant flux of core 11 is due to the primary current being greater than the secondary current or the secondary current being greater than the primary current. Therefore when the circuit becomes unbalanced the relay 23 does not indicate whether we ought to reduce the secondary current in coil 12 or to increase it. This difficulty may be overcome by several methods, one of which is illustrated in Fig. 2. In this figure the current in the secondary winding is controlled through a reversing contactor 26 and a position relay 27 from the bridge relay 23. By a position relay is meant a relay which remains in the position in which it was last thrown by energizing one or the other of two operating coils 28 and 29. Thus, if this relay is thrown so as to operate the motor 30 in the direction which increases the current, it remains in this position until the other operating coil is energized. Under normal conditions the position relay 27 will rest in the position which operates the motor 30 in the direction which reduces the resistance of the rheostat 14' and increases the secondary current in coil 12. A relay 31 operated by the secondary current is arranged to pick up at a value of current corresponding to the maximum scale reading of the ammeter 15. When this relay operates it throws the position relay 27 from the direction corresponding to increase of secondary current, which is the position represented, onto the opposite contact. The contacts controlled by relay 27 control the reversing contactor 26 and the operation just described causes the motor 30 to operate the rheostat in such a direction as to decrease the current flow in the secondary circuit of the coil 12. Relay 31 will now drop out, but the position relay 27 will remain in the left-hand position so that motor 30 will continue operating until the rheostat arm strikes the limit switch indicated at 32. This closes coil 28 of relay 27 and reverses the position of its contactor to that represented. If there is any current flowing in conductor 10, the bridge circuit will be unbalanced and contact 25 will be closed so that the motor 30 will start operating in the opposite direction to increase the current in coil 12. This will continue until a balanced condition is reached and contacts 25 open and the motor 30 stops. Under these conditions the ammeter 15 indicates the current flow in the conductor 10. If the primary current now changes to a higher value relay contacts 25 close and the motor 30 increases the current in coil 12 until the bridge is again balanced. However, if the primary current decreases, the motor 30 will run the rheostat up to the maximum current position, will then return to the "all in" position and will then approach the balance point from below and stop when the new balance point is reached.

The automatic system of Fig. 2, depending as it does on mechanical contact devices, relays and a motor which requires an appreciable time for operating the bridge to a balanced condition is not as practicable as is desired, but it illustrates the operating ation which it performs in balancing the principles and shows the sequence of operbridge under the two unbalancing conditions.

In Fig. 3, there is shown an arrangement similar in operating processes and in principle to the system shown in Fig. 2, but instead of using electro-mechanical apparatus I have employed vacuum tubes so as to carry out the same operation with apparatus possessing neither contacts or moving parts. In addition to the advantages of the elimination of these items with respect to maintenance and adjustment, I obtain a much faster operating speed and much quicker response so that in effect the control circuit will establish a new balance point so rapidly that the ammeter 15 will not follow the complete scanning of the scale which the system in principle carries out. In Fig. 3, a 5-electrode detector vacuum tube 35 takes the place of the relay 23 in Fig. 2. The grid of this vacuum tube is connected through a transformer 34 so as to become biased to allow current to flow through tube 35 whenever the bridge is unbalanced. The tube 35 is normally biased to cut off, but when the bridge is unbalanced the tube charges a condenser 36 which in turn biases the grid of a 3-electrode tube 38 and tube 38 regulates the current in the secondary winding 12 of the transformer. A transformer 33 supplies the energy for charging the condenser 36. A battery 40 is used for determining the initial bias upon the grids of the two vacuum tubes. A direct current supply indicated at 41 supplies current to the secondary circuit which is regulated by the vacuum tube 38. It will be seen that so long as bridge is unbalanced the detector tube 35 continues to charge the condenser 36 and as soon as this charge becomes sufficiently high so that enough secondary current flows to balance the bridge the detector tube 35 ceases to conduct and a reading of the ammeter 15 in the secondary circuit is then a measure of the primary current in conductor 10. Should the line current increase tube 35 will charge condenser 36 to a still higher voltage producing a higher bias on tube 38 and increasing the secondary current until a new balance point is obtained.

In the above it was assumed that the bias applied to tube 35 was due to insufficient current in the secondary of the transformer 12. If now the line current in conductor 10 decreases instead of increasing, vacuum tube 35 will charge condenser 36 in the same way but no balance point will be reached because the secondary current necessary to balance the bridge is less than that which is flowing in the secondary circuit. To take care of this condition the following arrangement is used: A high resistance 37 is connected across condenser 36 causing it to discharge continuously at a moderate rate, slower than it is charged by the tube. Thus if the line current in conductor 10 does not fall too suddenly the condenser 36 discharges until the secondary current is reduced to the proper value. The addition of this condenser leak resistance introduces a new feature in the operation of the circuit. If it is assumed that the line current now remains constant it will be apparent that due to the steady discharge of the condenser 36 the secondary current will tend to be decreased still further and that it will fall below the value necessary to balance the bridge. As soon as the bridge commences to unbalance the detector tube 35 will charge the condenser 36 until the bridge is again balanced. As soon as the charge leaks off again through the resistance 37 the bridge will become again unbalanced and will automatically be again corrected in the same way. This action is carried on continuously so that the bridge is kept balanced by a dynamic or "teetering" principle similar to the way in which a Tirrill regulator operates. This fluctuation takes place at a relatively rapid rate, faster than the ammeter needle can follow and the instrument furnishes a steady reading analogous to the way that the Tirrill regulator keeps a steady voltage on its generator. The instrument 15 should be calibrated under this condition of operation.

Now, if the line current should suddenly decrease, so that the bridge rapidly passes through the balance point and becomes unbalanced due to too much secondary current, the detector will as before continue to increase the charge of the condenser 36. The voltage held by condenser 36 will rise and the secondary current will be still further increased instead of decreased. To take care of this condition, a hot cathode mercury vapor tube 42 is connected in parallel with the condenser as represented. The characteristics of this tube are such that when the grid has a negative bias it prevents the flow of current through the tube, but when the grid bias is raised to have a positive potential it ceases to have any further influence upon the anode current which is determined entirely by the circuit voltage and impedance. When this tube conducts current the condenser 36 is instantly and completely discharged. It will be noted that the grid of tube 42 is connected in series with the bias battery 40 to the anode. The battery maintains the grid at a negative potential relative to the anode. As long as the condenser voltage is less than that of the battery the resultant voltage between the grid and cathode will be negative and the tube will not pass current. But when the condenser voltage becomes greater than the battery voltage due to a high charge on condenser 36 the grid will go positive and the tube will allow current to flow discharging the condenser. The value of the grid bias voltage is so adjusted that so long as the condenser voltage is less than that corresponding to a maximum scale reading of the ammeter 15, tube 42 is entirely nonconducting and has no effect upon the action of the circuit. But when the line current is suddenly reduced and the secondary current, already greater than that required to balance the primary ampere turns, is still further increased by action of the bridge circuit and detector tube 35, the condenser voltage increases until it reaches the "off scale" value and tube 42 discharges the condenser. Both the condenser voltage and the secondary current are now instantly reduced to zero, the bridge is again unbalanced, this time because the secondary current is too low to balance the primary excitation of the transformer. Again the condenser is charged and the secondary current increases. This time the balance of the bridge is reached as the current rises and the condenser then ceases to be charged. Thus when there is a sudden drop in line current the condenser voltage rises, uncontrolled, to a maximum value, is instantly reduced to zero, and then rises to the balance point. Thus the function of the tube 42 is the same as that of the overcurrent relay 31 of Fig. 2. However, the action takes place so rapidly that the instrument movement cannot follow it. Instead, the pointer of the ammeter 15 moves directly to the lower scale reading corresponding to the reduced value of line current and thus the line current is continuously indicated under all conditions, regardless of the manner in which it may vary.

Fig. 4 differs from Fig. 3 in that a pair of vacuum tubes 38 are controlled by the detector tube 35 and are arranged to supply the secondary current from an alternating current source 43 by full wave rectification. No direct current source of supply is needed in this circuit. The condenser and reactance represented at 44 is a filter arrangement for the purpose of making the secondary circuit free from ripples. The battery represented at 40 in Fig. 3 has been divided into three separate batteries in Fig. 4, but their purpose is the same and except as noted above, the operation of this modification is the same as is described in connection with Fig. 3.

Fig. 5 is much the same as Fig. 4 with the exception that a different type of tube is represented for supplying the secondary circuit by full wave rectification. In this modification the tubes 47 and 48 are represented as being of the hot cathode mercury vapor type similar to that represented at 42 and these tubes are capable of supplying a much higher current than the arrangement of Fig. 4. Thus in Fig. 5, the secondary current may be of the order of amperes instead of milliamperes, which makes it possible to use a fewer number of turns for the secondary winding 12 of the transformer and makes it feasible to connect relay devices directly in the secondary circuit. The control of the tubes 47 and 48 is by means of a vacuum tube 38 supplying a saturated reactor 45 connected in a network for shifting the phase of the voltages applied to the grids of tubes 47 and 48 supplied from the transformer 46. This is one of a number of different phase shifting circuits by means of which vector displacement of the grid voltages may be obtained for controlling the average value of the anode current of this type of tube as described by Dr. A. W. Hull in the G. E. Review of April, 1929, in the article beginning on page 213. The network includes a fixed resistance 49. When the reactance 45 is unsaturated, its impedance is high and the grid voltage lags behind the anode voltage and the anode current is then a minimum. However, when current flows to the saturating winding of the reactor as controlled by tube 38, the grid voltage applied to tubes 47 and 48 is advanced and the anode current is increased.

It will be noted that in Figs. 3, 4 and 5, portion of the core 11 on which the detector coil 13 is wound is represented as being of reduced cross-section. This arrangement is beneficial in order that the direct current magnetomotive force required to control the impedance of coil 13 be kept at a low value. The diameter of the core should be sufficient to allow it to fit over a high voltage bushing. The length of the magnetic circuit may exceed 3 feet. It is therefore desirable to construct the core so that only a small portion of the total length becomes more or less saturated, the remainder of the core operating at a low flux density. The total reluctance of the magnetic circuit will then be substantially equal to that of the reduced section and a slight change in this reluctance by an unbalancing of the ampere turns in the primary and secondary provides a very sensitive arrangement for disturbing the balance of the bridge circuit.

From the investigations which I have made it appears that the measuring scheme herein described may be expected to operate with high accuracy and little trouble. Because of the balance principle the apparatus is substantially independent of the characteristics of the tube and the tubes may be changed without disturbing the calibration. Its operation is independent of the impedance in the secondary circuit so that relays and telemetering apparatus operated over a considerable length of circuit may be included in the secondary measuring circuit if desired.

In accordance with the provisions of the patent statutes, I have described the principle of operation of my invention, together with the apparatus which I now consider to represent the best embodiments thereof, but I desire to have it understood that the apparatus shown and described is only illustrative, and that the invention may be carried out by other means.

What I claim as new and desire to secure by Letters Patent of the United States is:—

1. Measuring apparatus comprising a core of magnetic material, a primary circuit for producing a unidirectional flux in said core, a measuring circuit for neutralizing the flux produced in said core by the primary circuit, and an alternating current impedance bridge, one arm of which comprises a winding on said core for determining when the unidirectional flux of said core is neutralized.

2. Measuring apparatus comprising a closed magnetic circuit having a reduced cross-section at one point therein, a primary circuit for producing a unidirectional flux in said core, a measuring circuit for neutralizing the flux produced in said core by the primary circuit, and means including a winding about the reduced cross-section of the magnetic circuit for determining when the unidirectional flux is neutralized.

3. Measuring apparatus comprising a magnetic circuit threaded by two direct current circuits, means included in one of said direct current circuits for varying the current therein for the purpose of neutralizing unidirectional flux in the magnetic circuit produced therein by the other direct current circuit, and vacuum tube control means responsive to unidirectional flux in said magnetic circuit for controlling said current varying means.

4. Measuring apparatus comprising a closed magnetic circuit threaded by two direct current circuits, means included in one circuit for varying its current for the purpose of neutralizing unidirectional flux in the magnetic circuit produced therein by the other direct current circuit, an impedance bridge, one arm of which comprises a winding on the magnetic circuit, said bridge being adjusted to a balanced condition when the unidirectional flux in the magnetic circuit is zero, and means responsive to an unbalancing of said bridge for controlling said current varying means to bring about a balanced condition.

5. Measuring apparatus comprising a magnetic circuit threaded by two direct current circuits, means included in one of said circuits for varying its current for the purpose of neutralizing the unidirectional flux in the magnetic circuit produced by the other direct current circuit, means responsive to unidirectional flux in either direction in said magnetic circuit for controlling said current varying means so as to increase the current in the controlled circuit, and means responsive to a predetermined current in the controlled circuit in excess of that required for neutralization for reducing said current to a value below that required for neutralization.

6. Measuring apparatus comprising a magnetic core threaded by a direct current circuit in which it is desired to measure the current, a winding on said core included in a direct current measuring circuit for neutralizing the ampere turns of the first-mentioned circuit, means for varying the current in the measuring circuit, an impedance bridge having an arm comprising a coil wound on the magnetic core, said bridge being balanced when the ampere turns of the two direct current circuits are neutralized, and vacuum tube means influenced by an unbalanced condition of said bridge for controlling said current varying means to reestablish a balanced condition.

7. Measuring apparatus comprising a magnetic core threaded by a direct current circuit in which it is desired to measure the current, a winding on said core included in a measuring circuit for neutralizing the ampere turns of the first-mentioned circuit, vacuum tube rectifying means for supplying direct current to the measuring circuit, detector vacuum tube means for controlling said rectifying means, and means responsive to any unbalance in the ampere turns on the magnetic core for controlling the detector tube.

8. Measuring apparatus comprising a magnetic circuit interlinking two direct current circuits, one of which is a measuring circuit having current varying means for the purpose of neutralizing flux produced in the magnetic circuit by the other direct current circuit, a winding on the magnetic circuit responsive to unidirectional flux therein occasioned by any unbalancing of the ampere turns of the two direct current circuits, a vacuum tube controlled by said winding so as to pass current only when the direct current ampere turns on the magnetic circuit are unbalanced, a condenser charged by said tube, means responsive to the charge on said condenser for controlling the flow of direct current in the measuring circuit in direct proportion to such charge, and a resistance shunting said condenser for discharging it at a slower rate than it is charged by said tube.

9. Measuring apparatus comprising a magnetic circuit interlinking two direct current circuits, one of which is a measuring circuit having current varying means for the purpose of neutralizing flux produced in the magnetic circuit by the other direct current circuit, a winding on the magnetic circuit responsive to any unbalanced unidirectional flux therein, a vacuum tube controlled by said winding so as to pass current only when an unbalanced unidirectional flux exists in the magnetic circuit, a condenser charged by said tube, means responsive to the charge on said condenser for controlling the flow of direct current in the measuring circuit in proportion to such charge, and a hot cathode mercury vapor tube connected across said condenser and controlled by the charge thereon for discharging the condenser when its charge exceeds a predetermined amount.

In witness whereof, I have hereunto set my hand this 26th day of November, 1930.

ALAN S. FITZ GERALD.

CERTIFICATE OF CORRECTION.

Patent No. 1,825,514.  Granted September 29, 1931, to

ALAN S. FITZ GERALD.

It is hereby certified that error appears in the printed specification of the above numbered patent requiring correction as follows: Page 1, line 12, for number "552" read 752; page 3, line 46, strike out "ation which it performs in balancing the" and insert the same before "bridge" in line 48; and that the said Letters Patent should be read with this correction therein that the same may conform to the record of the case in the Patent Office.

Signed and sealed this 8th day of December, A. D. 1931.

(Seal)

M. J. Moore,
Acting Commissioner of Patents.